(12) United States Patent
Jalan et al.

(10) Patent No.: US 9,942,152 B2
(45) Date of Patent: Apr. 10, 2018

(54) FORWARDING DATA PACKETS USING A SERVICE-BASED FORWARDING POLICY

(71) Applicant: A10 NETWORKS, INC., San Jose, CA (US)

(72) Inventors: Rajkumar Jalan, Saratoga, CA (US); Gurudeep Kamat, San Jose, CA (US); Swaminathan Sankar, San Jose, CA (US); Hasnain Karampurwala, Santa Clara, CA (US)

(73) Assignee: A10 NETWORKS, INC., San Jose, CA (US)

( * ) Notice: Subject to any disclaimer, the term of this patent is extended or adjusted under 35 U.S.C. 154(b) by 92 days.

(21) Appl. No.: 14/225,341

(22) Filed: Mar. 25, 2014

(65) Prior Publication Data

US 2015/0281087 A1 Oct. 1, 2015

(51) Int. Cl.
  *G08C 15/00* (2006.01)
  *H04L 12/803* (2013.01)
  *H04L 12/813* (2013.01)
  *H04L 12/701* (2013.01)
  *H04L 12/851* (2013.01)

(52) U.S. Cl.
  CPC ............ *H04L 47/125* (2013.01); *H04L 45/00* (2013.01); *H04L 47/20* (2013.01); *H04L 47/2441* (2013.01)

(58) Field of Classification Search
  CPC .................................................. H04L 67/1012
  See application file for complete search history.

(56) References Cited

U.S. PATENT DOCUMENTS

| 4,403,286 A | 9/1983 | Fry et al. |
| 4,495,570 A | 1/1985 | Kitajima et al. |
| 4,577,272 A | 3/1986 | Ballew et al. |
| 4,720,850 A | 1/1988 | Oberlander et al. |
| 4,864,492 A | 9/1989 | Blakely-Fogel et al. |
| 4,882,699 A | 11/1989 | Evensen |

(Continued)

FOREIGN PATENT DOCUMENTS

| CN | 1372662 A | 10/2002 |
| CN | 1449618 | 10/2003 |

(Continued)

OTHER PUBLICATIONS

Spatscheck et al., "Optimizing TCP Forwarder Performance", IEEE/ACM Transactions on Networking, vol. 8, No. 2, Apr. 2000.

(Continued)

*Primary Examiner* — Huy D Vu
*Assistant Examiner* — Kevin Cunningham
(74) *Attorney, Agent, or Firm* — AMPACC Law Group, LLP; Keith Kline

(57) ABSTRACT

Methods and systems are provided for forwarding data packets in a service network using a service-based policy. A gateway node may receive data packets from a service session and send the data packets for a forwarding node. The forwarding node may match the service session data packet against a service address and forwarding policy, the forwarding policy being based on capabilities and service configurations of the servicing nodes in the service network. Forwarding node may then forward the service session data packet to a servicing node in accordance with the forwarding policy, and send the service session data packet to a server for processing.

23 Claims, 7 Drawing Sheets

(56) References Cited

U.S. PATENT DOCUMENTS

| | | |
|---|---|---|
| 5,031,089 A | 7/1991 | Liu et al. |
| 5,218,602 A | 6/1993 | Grant et al. |
| 5,218,676 A | 6/1993 | Ben-Ayed et al. |
| 5,293,488 A | 3/1994 | Riley et al. |
| 5,341,477 A | 8/1994 | Pitkin et al. |
| 5,432,908 A | 7/1995 | Heddes et al. |
| 5,537,542 A | 7/1996 | Eilert et al. |
| 5,563,878 A | 10/1996 | Blakeley et al. |
| 5,603,029 A | 2/1997 | Aman et al. |
| 5,675,739 A | 10/1997 | Eilert et al. |
| 5,740,371 A | 4/1998 | Wallis |
| 5,751,971 A | 5/1998 | Dobbins et al. |
| 5,754,752 A | 5/1998 | Sheh et al. |
| 5,774,660 A | 6/1998 | Brendel et al. |
| 5,774,668 A | 6/1998 | Choquier et al. |
| 5,796,936 A | 8/1998 | Watabe et al. |
| 5,812,771 A | 9/1998 | Fee et al. |
| 5,828,847 A | 10/1998 | Gehr et al. |
| 5,835,724 A | 11/1998 | Smith |
| 5,867,636 A | 2/1999 | Walker |
| 5,867,661 A | 2/1999 | Bittinger et al. |
| 5,875,296 A | 2/1999 | Shi et al. |
| 5,917,997 A | 6/1999 | Bell et al. |
| 5,918,017 A | 6/1999 | Attanasio et al. |
| 5,923,854 A | 7/1999 | Bell et al. |
| 5,931,914 A | 8/1999 | Chiu |
| 5,935,207 A | 8/1999 | Logue et al. |
| 5,935,215 A | 8/1999 | Bell et al. |
| 5,941,988 A | 8/1999 | Bhagwat et al. |
| 5,944,794 A | 8/1999 | Okamoto et al. |
| 5,946,686 A | 8/1999 | Schmuck et al. |
| 5,951,650 A | 9/1999 | Bell et al. |
| 5,951,694 A | 9/1999 | Choquier et al. |
| 5,958,053 A | 9/1999 | Denker |
| 5,995,981 A | 11/1999 | Wikstrom |
| 6,003,069 A | 12/1999 | Cavill |
| 6,006,264 A | 12/1999 | Colby et al. |
| 6,006,269 A | 12/1999 | Phaal |
| 6,031,978 A | 2/2000 | Cotner et al. |
| 6,041,357 A | 3/2000 | Kunzelman et al. |
| 6,047,268 A | 4/2000 | Bartoli et al. |
| 6,076,108 A | 6/2000 | Courts et al. |
| 6,088,728 A | 7/2000 | Bellemore et al. |
| 6,098,093 A | 8/2000 | Bayeh et al. |
| 6,104,717 A | 8/2000 | Coile et al. |
| 6,119,174 A | 9/2000 | Borowsky et al. |
| 6,128,279 A | 10/2000 | O'Neil et al. |
| 6,131,163 A | 10/2000 | Wiegel |
| 6,141,759 A | 10/2000 | Braddy |
| 6,185,598 B1 | 2/2001 | Farber et al. |
| 6,219,706 B1 | 4/2001 | Fan et al. |
| 6,223,205 B1 | 4/2001 | Harchol-Balter et al. |
| 6,223,287 B1 | 4/2001 | Douglas et al. |
| 6,247,057 B1 | 6/2001 | Barrera, III |
| 6,249,820 B1 | 6/2001 | Dobbins et al. |
| 6,252,878 B1 | 6/2001 | Locklear, Jr. et al. |
| 6,259,705 B1 | 7/2001 | Takahashi et al. |
| 6,262,976 B1 | 7/2001 | McNamara |
| 6,286,039 B1 | 9/2001 | Van Horne et al. |
| 6,314,463 B1 | 11/2001 | Abbott et al. |
| 6,317,786 B1 | 11/2001 | Yamane et al. |
| 6,321,338 B1 | 11/2001 | Porras et al. |
| 6,324,177 B1 | 11/2001 | Howes et al. |
| 6,330,560 B1 | 12/2001 | Harrison et al. |
| 6,339,423 B1 | 1/2002 | Sampson et al. |
| 6,353,614 B1 | 3/2002 | Borella et al. |
| 6,363,075 B1 | 3/2002 | Huang et al. |
| 6,363,081 B1 | 3/2002 | Gase |
| 6,374,300 B2 | 4/2002 | Masters |
| 6,374,359 B1 | 4/2002 | Shrader et al. |
| 6,381,632 B1 | 4/2002 | Lowell |
| 6,393,475 B1 | 5/2002 | Leong et al. |
| 6,397,261 B1 | 5/2002 | Eldridge et al. |
| 6,430,622 B1 | 8/2002 | Aiken, Jr. et al. |
| 6,445,704 B1 | 9/2002 | Howes et al. |
| 6,446,225 B1 | 9/2002 | Robsman et al. |
| 6,459,682 B1 | 10/2002 | Ellesson et al. |
| 6,490,682 B2 | 12/2002 | Vanstone et al. |
| 6,496,866 B2 | 12/2002 | Attanasio et al. |
| 6,510,464 B1 | 1/2003 | Grantges, Jr. et al. |
| 6,515,988 B1 | 2/2003 | Eldridge et al. |
| 6,542,926 B2 | 4/2003 | Zalewski et al. |
| 6,564,215 B1 | 5/2003 | Hsiao et al. |
| 6,567,857 B1 | 5/2003 | Gupta et al. |
| 6,578,066 B1 | 6/2003 | Logan et al. |
| 6,587,866 B1 | 7/2003 | Modi et al. |
| 6,591,262 B1 | 7/2003 | MacLellan et al. |
| 6,594,268 B1 | 7/2003 | Aukia et al. |
| 6,598,167 B2 | 7/2003 | Devine et al. |
| 6,606,315 B1 | 8/2003 | Albert et al. |
| 6,609,150 B2 | 8/2003 | Lee et al. |
| 6,611,498 B1 | 8/2003 | Baker et al. |
| 6,650,641 B1 | 11/2003 | Albert et al. |
| 6,657,974 B1 | 12/2003 | Britton et al. |
| 6,697,354 B1 | 2/2004 | Borella et al. |
| 6,701,377 B2 | 3/2004 | Burmann et al. |
| 6,704,317 B1 | 3/2004 | Dobson |
| 6,711,618 B1 | 3/2004 | Danner et al. |
| 6,714,979 B1 | 3/2004 | Brandt et al. |
| 6,718,383 B1 | 4/2004 | Hebert |
| 6,742,126 B1 | 5/2004 | Mann et al. |
| 6,745,229 B1 | 6/2004 | Gobin et al. |
| 6,748,413 B1 | 6/2004 | Boumas |
| 6,748,414 B1 | 6/2004 | Bournas |
| 6,760,758 B1 | 7/2004 | Lund et al. |
| 6,763,370 B1 | 7/2004 | Schmeidler et al. |
| 6,763,468 B2 | 7/2004 | Gupta et al. |
| 6,772,333 B1 | 8/2004 | Brendel |
| 6,772,334 B1 | 8/2004 | Glawitsch |
| 6,779,017 B1 | 8/2004 | Lamberton et al. |
| 6,779,033 B1 | 8/2004 | Watson et al. |
| 6,877,095 B1 | 4/2005 | Allen |
| 6,886,044 B1 | 4/2005 | Miles et al. |
| 6,892,307 B1 | 5/2005 | Wood et al. |
| 6,941,384 B1 | 9/2005 | Aiken, Jr. et al. |
| 6,952,728 B1 | 10/2005 | Alles et al. |
| 6,954,784 B2 | 10/2005 | Aiken, Jr. et al. |
| 6,963,917 B1 | 11/2005 | Callis et al. |
| 6,965,930 B1 | 11/2005 | Arrowood et al. |
| 6,996,617 B1 | 2/2006 | Aiken, Jr. et al. |
| 6,996,631 B1 | 2/2006 | Aiken, Jr. et al. |
| 7,010,605 B1 | 3/2006 | Dharmarajan |
| 7,013,482 B1 | 3/2006 | Krumel |
| 7,058,600 B1 | 6/2006 | Combar et al. |
| 7,058,718 B2 | 6/2006 | Fontes et al. |
| 7,058,789 B2 | 6/2006 | Henderson et al. |
| 7,069,438 B2 | 6/2006 | Balabine et al. |
| 7,076,555 B1 | 7/2006 | Orman et al. |
| 7,120,697 B2 | 10/2006 | Aiken, Jr. et al. |
| 7,143,087 B2 | 11/2006 | Fairweather |
| 7,167,927 B2 | 1/2007 | Philbrick et al. |
| 7,181,524 B1 | 2/2007 | Lele |
| 7,188,181 B1 | 3/2007 | Squier et al. |
| 7,218,722 B1 | 5/2007 | Turner et al. |
| 7,225,249 B1 | 5/2007 | Barry et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,611 B2 | 9/2008 | Aiken, Jr. et al. |

(56) References Cited

U.S. PATENT DOCUMENTS

| | | |
|---|---|---|
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2* | 5/2011 | Hurtta ............... H04M 7/006 370/328 |
| 7,970,934 B1 | 6/2011 | Patel |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,234,650 B1 | 7/2012 | Eppstein et al. |
| 8,239,445 B1 | 8/2012 | Gage et al. |
| 8,255,644 B2 | 8/2012 | Sonnier et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,543,644 B2 | 9/2013 | Gage et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,118,618 B2 | 8/2015 | Davis |
| 9,118,620 B1 | 8/2015 | Davis |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,497,201 B2 | 11/2016 | Chen et al. |
| 2001/0015812 A1 | 8/2001 | Sugaya |
| 2001/0049741 A1 | 12/2001 | Skene et al. |
| 2002/0010783 A1 | 1/2002 | Primak et al. |
| 2002/0032777 A1 | 3/2002 | Kawata et al. |
| 2002/0078164 A1 | 6/2002 | Reinschmidt |
| 2002/0091831 A1 | 7/2002 | Johnson |
| 2002/0091844 A1 | 7/2002 | Craft et al. |
| 2002/0103916 A1 | 8/2002 | Chen et al. |
| 2002/0124089 A1 | 9/2002 | Aiken, Jr. et al. |
| 2002/0133491 A1 | 9/2002 | Sim et al. |
| 2002/0138618 A1 | 9/2002 | Szabo |
| 2002/0141448 A1 | 10/2002 | Matsunaga |
| 2002/0143953 A1 | 10/2002 | Aiken |
| 2002/0143954 A1 | 10/2002 | Aiken, Jr. et al. |
| 2002/0143991 A1 | 10/2002 | Chow et al. |
| 2002/0166080 A1 | 11/2002 | Attanasio et al. |
| 2002/0178259 A1 | 11/2002 | Doyle et al. |
| 2002/0178265 A1 | 11/2002 | Aiken, Jr. et al. |
| 2002/0178268 A1 | 11/2002 | Aiken, Jr. et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2002/0199000 A1 | 12/2002 | Banerjee |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0031180 A1* | 2/2003 | Datta ............... H04L 12/5692 370/392 |
| 2003/0035409 A1 | 2/2003 | Wang et al. |
| 2003/0035420 A1 | 2/2003 | Niu |
| 2003/0061402 A1 | 3/2003 | Yadav |
| 2003/0079146 A1 | 4/2003 | Burstein |
| 2003/0081624 A1 | 5/2003 | Aggarwal et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0152078 A1 | 8/2003 | Henderson et al. |
| 2003/0195962 A1 | 10/2003 | Kikuchi et al. |
| 2003/0202536 A1 | 10/2003 | Foster et al. |
| 2004/0001497 A1* | 1/2004 | Sharma ............... H04L 45/02 370/401 |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0253956 A1 | 12/2004 | Collins |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0021949 A1* | 1/2005 | Izawa ............... H04L 63/0464 713/165 |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |

(56) References Cited

U.S. PATENT DOCUMENTS

| | | |
|---|---|---|
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0141506 A1 | 6/2005 | Aiken, Jr. et al. |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1* | 7/2007 | O'Rourke ............ H04L 12/287 370/389 |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0274285 A1* | 11/2007 | Werber ............... H04L 41/0806 370/351 |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0320151 A1 | 12/2008 | McCanne et al. |
| 2009/0037361 A1 | 2/2009 | Prathaban et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0103710 A1* | 4/2009 | Ding .................. H04L 45/00 379/265.11 |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0188975 A1 | 7/2010 | Raleigh |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0013525 A1* | 1/2011 | Breslau ................. H04L 43/18 370/252 |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0064083 A1* | 3/2011 | Borkenhagen ......... H04L 45/02 370/392 |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |
| 2011/0276982 A1 | 11/2011 | Nakayama et al. |
| 2011/0289496 A1 | 11/2011 | Steer |
| 2011/0292939 A1* | 12/2011 | Subramaian et al. ........ 370/392 |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084419 A1 | 4/2012 | Kannan et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0144015 A1 | 6/2012 | Jalan et al. |
| 2012/0151353 A1 | 6/2012 | Joanny |
| 2012/0155495 A1 | 6/2012 | Clee et al. |
| 2012/0170548 A1 | 7/2012 | Rajagopalan et al. |
| 2012/0173759 A1 | 7/2012 | Agarwal et al. |

(56) References Cited

U.S. PATENT DOCUMENTS

| | | |
|---|---|---|
| 2012/0179770 A1 | 7/2012 | Jalan et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2012/0311116 A1 | 12/2012 | Jalan et al. |
| 2013/0007225 A1 | 1/2013 | Gage et al. |
| 2013/0046876 A1 | 2/2013 | Narayana et al. |
| 2013/0058335 A1 | 3/2013 | Koponen et al. |
| 2013/0074177 A1 | 3/2013 | Varadhan et al. |
| 2013/0083725 A1 | 4/2013 | Mallya et al. |
| 2013/0089099 A1 | 4/2013 | Pollock et al. |
| 2013/0091273 A1 | 4/2013 | Ly et al. |
| 2013/0100958 A1 | 4/2013 | Jalan et al. |
| 2013/0124713 A1 | 5/2013 | Feinberg et al. |
| 2013/0136139 A1 | 5/2013 | Zheng et al. |
| 2013/0148500 A1* | 6/2013 | Sonoda et al. ............... 370/231 |
| 2013/0166731 A1 | 6/2013 | Yamanaka et al. |
| 2013/0166762 A1 | 6/2013 | Jalan et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0191548 A1 | 7/2013 | Boddukuri et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0262702 A1 | 10/2013 | Davis |
| 2013/0282791 A1 | 10/2013 | Kruglick |
| 2013/0311686 A1 | 11/2013 | Fetterman et al. |
| 2014/0012972 A1 | 1/2014 | Han |
| 2014/0047115 A1 | 2/2014 | Lipscomb et al. |
| 2014/0089500 A1 | 3/2014 | Sankar et al. |
| 2014/0164617 A1 | 6/2014 | Jalan et al. |
| 2014/0169168 A1 | 6/2014 | Jalan et al. |
| 2014/0207845 A1 | 7/2014 | Han et al. |
| 2014/0258465 A1 | 9/2014 | Li |
| 2014/0258536 A1 | 9/2014 | Chiong |
| 2014/0269728 A1 | 9/2014 | Jalan et al. |
| 2014/0286313 A1 | 9/2014 | Fu et al. |
| 2014/0298091 A1 | 10/2014 | Carlen et al. |
| 2014/0330977 A1 | 11/2014 | van Bemmel |
| 2014/0330982 A1 | 11/2014 | Jalan et al. |
| 2014/0334485 A1* | 11/2014 | Jain et al. .................. 370/389 |
| 2014/0359052 A1 | 12/2014 | Joachimpillai et al. |
| 2015/0039671 A1 | 2/2015 | Jalan et al. |
| 2015/0085650 A1 | 3/2015 | Cui et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0281104 A1 | 10/2015 | Golshan et al. |
| 2015/0296058 A1 | 10/2015 | Jalan et al. |
| 2015/0312268 A1 | 10/2015 | Ray |
| 2015/0333988 A1 | 11/2015 | Jalan et al. |
| 2015/0350048 A1 | 12/2015 | Sampat et al. |
| 2015/0350379 A1 | 12/2015 | Jalan et al. |
| 2015/0350383 A1 | 12/2015 | Davis |
| 2015/0381465 A1 | 12/2015 | Narayanan et al. |
| 2016/0014052 A1 | 1/2016 | Han |
| 2016/0036778 A1 | 2/2016 | Chen et al. |
| 2016/0042014 A1 | 2/2016 | Jalan et al. |
| 2016/0043901 A1 | 2/2016 | Sankar et al. |
| 2016/0044095 A1 | 2/2016 | Sankar et al. |
| 2016/0050233 A1 | 2/2016 | Chen et al. |
| 2016/0088074 A1 | 3/2016 | Kannan et al. |
| 2016/0105395 A1 | 4/2016 | Chen et al. |
| 2016/0105446 A1 | 4/2016 | Chen et al. |
| 2016/0119382 A1 | 4/2016 | Chen et al. |
| 2016/0139910 A1 | 5/2016 | Ramanathan et al. |
| 2016/0156708 A1 | 6/2016 | Jalan et al. |
| 2016/0173579 A1 | 6/2016 | Jalan et al. |
| 2016/0261642 A1 | 9/2016 | Chen et al. |
| 2017/0041350 A1 | 2/2017 | Chen et al. |

FOREIGN PATENT DOCUMENTS

| | | |
|---|---|---|
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 101495993 A | 7/2009 |
| CN | 101567818 A | 10/2009 |
| CN | 101878663 A | 11/2010 |
| CN | 102104548 A | 6/2011 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103365654 A | 10/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| EP | 0648038 A2 | 4/1995 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| HK | 1182560 | 11/2013 |
| HK | 1183569 A | 12/2013 |
| HK | 1183996 A | 1/2014 |
| HK | 1188498 A | 5/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| JP | H09-097233 | 4/1997 |
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| JP | 5946189 B2 | 6/2016 |

(56) References Cited

FOREIGN PATENT DOCUMENTS

| | | |
|---|---|---|
| KR | 10-0830413 | 5/2008 |
| KR | 20130096624 | 8/2013 |
| KR | 101576585 B1 | 12/2015 |
| WO | 01/13228 | 2/2001 |
| WO | 2001014990 | 3/2001 |
| WO | WO2001045349 | 6/2001 |
| WO | 2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2011049770 | 4/2011 |
| WO | WO2011079381 A1 | 7/2011 |
| WO | 2011149796 | 12/2011 |
| WO | 2012050747 | 4/2012 |
| WO | 2012075237 | 6/2012 |
| WO | WO2012083264 A2 | 6/2012 |
| WO | WO2012097015 A2 | 7/2012 |
| WO | 2013070391 | 5/2013 |
| WO | 2013081952 | 6/2013 |
| WO | 2013096019 | 6/2013 |
| WO | 2013112492 | 8/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | WO2014138483 | 9/2014 |
| WO | WO2014144837 | 9/2014 |
| WO | WO2014179753 | 11/2014 |
| WO | WO2015153020 A1 | 10/2015 |

OTHER PUBLICATIONS

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", the Journal of Supercomputing, Kluwer Academic Publishers, BO, vol. 53, No. 3, Jul. 3, 2009.

Cardellini et al., "Dynamic Load Balancing on Web-server Systems", IEEE Internet Computing, vol. 3, No. 3, pp. 28-39, May-Jun. 1999.

Hunt et al. NetDispatcher: A TCP Connection Router, IBM Research Report RC 20853 May 19, 1997.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

"tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

Cardellini, et al., "Dynamic Load Balancing on Web-Server Systems", IEEE Internet Computing, 1999, vol. 3(3), pp. 28-29.

Samar, V., "Single Sign-On Using Cookies for Web Applications," IEEE 8th International Workshop, 1999, pp. 158-163.

Apostolopoulos, G. et al., "Design, Implementation and Performance of a Content-Based Switch," INFOCOM 2000, Nineteenth Annual Joint Conference of the IEEE Computer and Communication Societies, IEEE, Mar. 2000, pp. 1117-1136, vol. 3.

Koike et al., "Transport Middleware for Network-Based Control," IEICE Technical Report, Jun. 22, 2000, vol. 100, No. 53, pp. 13-18.

\* cited by examiner

CLASSIFICATION 306

SOURCE IP ADDRESS CLASSIFICATION 402

SOURCE PORT CLASSIFICATION 404

DESTINATION PORT CLASSIFICATION 406

LINK LAYER ADDRESS CLASSIFICATION 408

FIG. 4

FORWARDING DATA PACKETS USING A SERVICE-BASED FORWARDING POLICY

CROSS REFERENCE TO RELATED APPLICATIONS

This application is a related to co-pending U.S. application Ser. No. 14/225,341, titled "Distributing Service Sessions." The disclosures of the above referenced application are hereby incorporated by reference.

BACKGROUND OF THE INVENTION

Field of the Invention

The present invention relates generally to data networks, and more particularly to a network for distribution and load balancing for a virtual service.

Description of the Related Art

Service load balancers, such as server load balancers, application delivery controllers, or traffic managers, typically balance load among a plurality of servers providing network services such as Web documents, voice calls, advertisements, enterprise applications, video streaming services, file transfers, gaming, or any broadband services. A network service is associated typically with an IP address. In a typical IP network, an IP address is assigned to a network computing device. Network routers and switches are designed to forward data packets destined to the IP address to the assigned network computing device. One cannot assign the same IP address to multiple network computing devices with current network routers and switches.

When a service provider deploys a network service, the service provider needs to consider expected client demand that can change between high demand to low demand at different times. In one scenario, a software vendor provides software patches on a regular basis. Normally, a single service load balancer is capable of handling the software patch download demand. However, when the software vendor rolls out a major software update, the software vendor anticipates a dramatic increase of download demand shortly after the major software update is released. The software vendor may plan to add additional resources, such as two additional service load balancers and four more patch servers to handle the increased demand. The software vendor could use different IP addresses for the additional service load balancers. However, this would require the client devices to learn the new IP addresses before requesting the software update service.

The day after the major software update release, the software vendor may see a substantial decline of demand. The software vendor may remove the two added service load balancers and four patch servers. By doing so, the client devices which earlier learned the new IP addresses of the now-removed service load balancers can no longer use the patch service. The client devices must reacquire the IP address of the remaining service load balancer in order to use the software patch service going forward.

During the software update release, the software vendor may have a number of major customers, some of whom require sessions to be encrypted and some of whom require dedicated service load balancers. Some of the added service load balancers may be configured with large memory and processing capacity to handle large bursts of requests. Moreover, some service load balancers may be equipped with special hardware processing capabilities to handle certain services. Such hardware processing capabilities may include, but are not limited to, security processors, special digital signal processors (DSP), network processors (NP), and graphics or video processors. Additional hardware capacity, such as larger memory module, higher performance processor, multi-core processors, and better hardware system design, also affects capabilities of each service load balancer. Special software, such as content caching algorithm or encryption algorithm, may differentiate one service load balancer from another. Furthermore, differentiation of service load balancers may depend on the clients of the service sessions. For example, when access to a government service comes from certain foreign client computers, the sessions may be best served by service load balancers equipped with additional security safeguards. Another example is when access of a company document services is within the company's computers, the accesses may be recorded by specific service load balancers in order to satisfy company regulation or legal compliance.

It should be apparent from the foregoing that there is a need to provide a dynamic service network to distribute service sessions to a plurality of service load balancers according to the capacities and capabilities of the service load balancers or to satisfy particular needs of the clients of the service network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure concerns methods and systems for forwarding data packets in a service network using a service-based policy. In one computer-implemented method for forwarding a data packet in a service network, the method comprises: receiving from a client device, the data packet destined to a servicing node; matching the data packet against a service address; matching the data packet against a classification rule in a forwarding policy associated with the service address, wherein the classification rule is based on a capability of a second servicing node; and upon determining that the data packet matches the service address and the packet matches the classification rule, sending to the servicing node.

The present disclosure further concerns a non-transitory computer-readable medium comprising instructions, which when executed by one or more processors, implements a method for forwarding a data packet in a service network according to the methods described herein.

In an exemplary computer-implemented method for generating a forwarding policy for a service network comprising a forwarding node and a plurality of servicing nodes, the method comprises: receiving a capability from a servicing node related to a service address; generating a plurality of classification rules based on the received capability and a second capability of another servicing node; and storing the generated classification rules in the forwarding policy.

The present disclosure further concerns a non-transitory computer-readable medium comprising instructions, which when executed by one or more processors, implements a method for method for generating a forwarding policy for a service network comprising a forwarding node and a plurality of servicing nodes according to the methods described herein.

The present disclosure also concerns a service network system for forwarding a data packet in a service network, the system comprising: a plurality of servicing nodes, wherein each of the plurality of servicing nodes is configured to: send to a network controller a capability associated to a service address; and send to the network controller a collection of statistics data related to the capability; a forwarding node, wherein the forwarding node is configured to: receive from the network controller a forwarding policy comprising a plurality of classification rules; receive a data packet; match the data packet against the service address; match the data packet against a classification rule of the forwarding policy; upon determining that the data packet matches the service address and the classification rule, send the data packet to a servicing node indicated by the classification rule; and send to the network controller a second collection of statistics data related to the forwarding policy; and the network controller, wherein the network controller is configured to: receive a plurality of capabilities from the plurality of servicing nodes; generate the plurality of classification rules based on the received plurality of capabilities; store the generated plurality of classification rules in the forwarding policy; send the forwarding policy to the forwarding node; receive the plurality of statistics data from the plurality of servicing nodes; receive the statistics data from the forwarding node; and generate a report based on the received statistics data.

BRIEF DESCRIPTION OF THE DRAWINGS

Embodiments are illustrated by way of example and not by limitation in the figures of the accompanying drawings, in which like references indicate similar elements and in which:

FIG. 4 illustrates an exemplary embodiment of a classification.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

Figure 1:
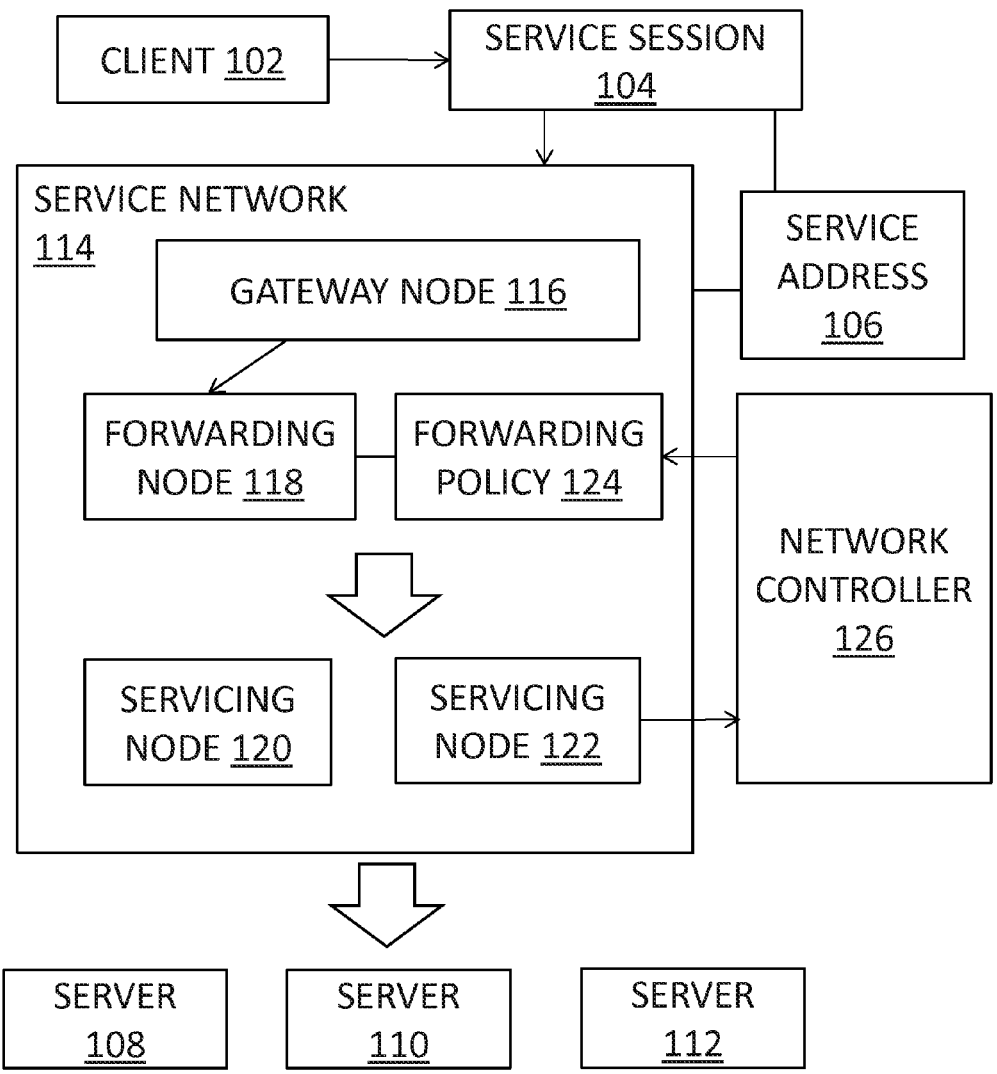
FIG. 1 illustrates an exemplary embodiment of a service data network distributing a service session based on a forwarding policy.

FIG. 1 illustrates an exemplary embodiment of a data network handling data packets of a service session using a service-based forwarding policy. Client 102 conducts a service session 104 for a service address 106 with server 108. In one embodiment, data packets of service session 104 are processed by service network 114 prior to being delivered to server 108. Service network 114 may include a plurality of network nodes such as a gateway node 116, a forwarding node 118, or one or more servicing nodes 120 and 122. Service network 114 may serve service address 106.

In some embodiments, gateway node 116 may receive data packets from service session 104 and send the data packets to forwarding node 118. When forwarding node 118 receives a service session 104 data packet, forwarding node 118 may match the service session 104 data packet against service address 106 and forwarding policy 124, which is based on capabilities and service configurations of servicing nodes in service network 114. Forwarding node 118 may forward service session 104 data packet to servicing node 120, in accordance with the forwarding policy 124. Servicing node 120 may process service session 104 data packet, select a server, such as server 108, and send service session 104 data packet to server 108.

Forwarding node 118 may receive forwarding policy 124 from network controller 126. Network controller 126 may generate forwarding policy 124 based on information capabilities and service configurations of a plurality of servicing nodes of service network 114.

Figure 2:
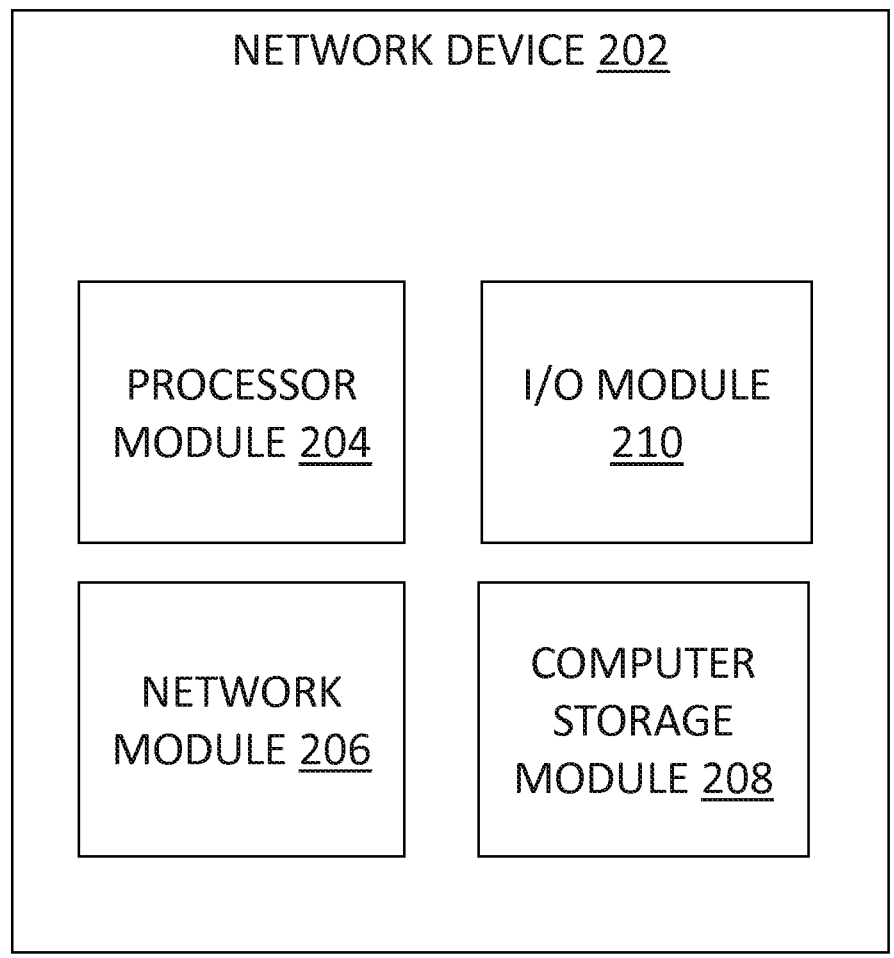
FIG. 2 illustrates an exemplary embodiment of a network device.

In exemplary embodiments, a network node, which can be a network controller 126, a gateway node 116, a forwarding node 118, or a servicing node of service network 114, illustrated as network device 202 in FIG. 2, may include a processor module 204, a network module 206, and a computer storage module 208. Processor module 204 may include one or more processors which may be a microprocessor, an Intel processor, an AMD processor, a MIPS processor, an ARM-based processor, a RISC processor, or any other type of processor. Processor module 204 may include one or more processor cores embedded in a processor. Additionally, processor module 204 may include one or more embedded processors or embedded processing elements in a Field Programmable Gate Array (FPGA), an Application Specific Integrated Circuit (ASIC), or Digital Signal Processor (DSP). In some embodiments, network module 206 may include a network interface such as Ethernet, optical network interface, a wireless network interface, T1/T3 interface, or a WAN or LAN interface. Furthermore, network module 206 may include a network processor. Computer storage module 208 may include RAM, DRAM, SRAM, SDRAM, or memory utilized by processor module 204 or network module 206. Computer storage module 208 may store data utilized by processor module 204. Computer storage module 208 may include a hard disk drive, a solid state drive, an external disk, a DVD, a CD, or a readable external disk. Additionally, computer storage module 208 may store one or more computer programming instructions, which when executed by processor module 204 or network module 206, implement one or more of the functionalities of the present invention. Network device 202 may also include an input/output (I/O) module 210 which may include a keyboard, a keypad, a mouse, a gesture-based input sensor, a microphone, a physical or sensory input peripheral, a display, a speaker, or a physical or sensory output peripheral.

In various embodiments, service network 114 may connect to at least one client device 102. Client device 102 may be a personal computer, a laptop, a smartphone, a cell phone, a tablet, a personal digital assistant (PDA), a desktop, a notebook, a set-top box, a network connected device, a network connecting computing device, or a network element such as an Ethernet switch, a router, or any network computing device seeking a service from a server.

Service network 114 may connect to one or more servers 108, 110, and 112. The servers may be any type of server, including, but not limited to, a Web server, a video server, a music server, an e-commerce server, an enterprise application server, a news server, a mobile broadband service server, a messaging server, an email server, a game server, an app server, an Internet radio server, a storage server, a social network services server, or a network computing device providing services to a service session 104 from client 102.

Service network 114 may be configured to serve service address 106. Service address 106 may represent a network address for service session 104 between client 102 and a server. Additionally, service address 106 may include one or more of an IP address, a TCP port number, a UDP port number, a data link layer identity, a VLAN identity, a network identity, and a service identity.

Figure 3:
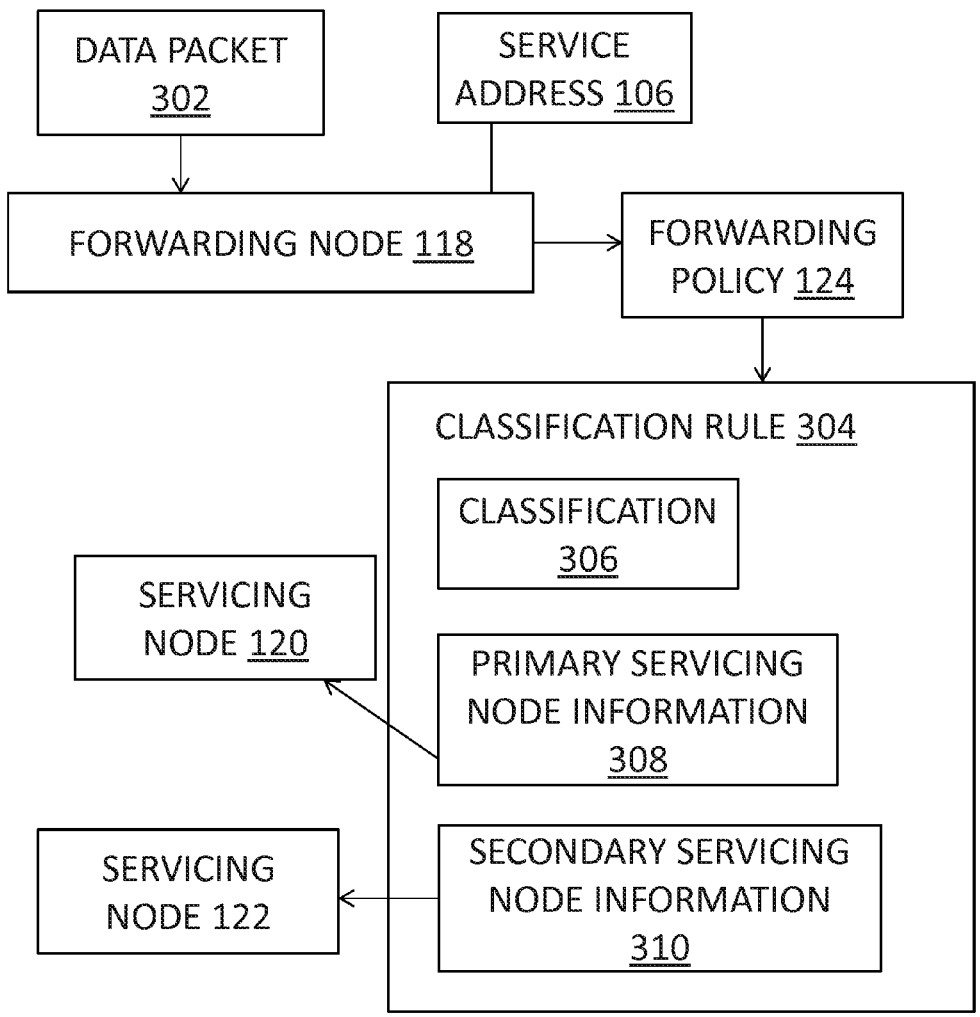
FIG. 3 illustrates an exemplary embodiment of a forwarding network node using a forwarding policy.

In an exemplary embodiment illustrated in FIG. 3, forwarding node 118 may receive data packet 302 of service session 104. Forwarding node 118 may match data packet 302 against service address 106. Data packet 302 may contain service address 106 as a destination network address. Forwarding node 118 may obtain a destination network address of data packet 302 and match the obtained network address against service address 106. In some embodiments, data packet 302 contains service address 106 in its payload. Forwarding node 118 may obtain a payload of data packet 302 and match the obtained payload against service address 106.

Upon determining data packet 302 matches service address 106, forwarding node 118 may match data packet 302 with forwarding policy 124 to select service node 120. Forwarding node 118 may match data packet against a classification rule 304 of forwarding policy 124. Classification rule 304 may include a classification 306, a primary servicing node information 308 and a secondary servicing node information 310. Primary servicing node information 308 may indicate selecting service node 120 to forward data packet 302. Furthermore, primary servicing node information 308 may include an identity of servicing node 120, a process to modify data packet 302 prior to sending to servicing node 120, or an indication for additional processing of data packet 302. Secondary servicing node information 310 may include an indication to select servicing node 122 to send data packet 302 under some condition about primary servicing node 120. Additionally, secondary servicing node information 310 may include an indication to send to servicing node 122 as well as to primary servicing node 120. Secondary servicing node information 310 may indicate that if servicing node 120 is not available or busy, servicing node 122 may be selected as a target to receive data packet 302.

Classification 306, as illustrated in FIG. 4, may include one or more of a source IP address classification 402, a source port classification 404, a destination port classification 406, or a link layer address classification 408. Source IP address classification 402 may include one or more IP addresses, one or more IP address ranges, one or more IP addresses with network masks, or an indication of a matching process applied to a source IP address. Source port classification 404 may include one or more TCP/UDP ports or one or more port ranges. Destination port classification 406 may include one or more TCP/UDP ports or one or more port ranges. Link layer address classification 408 may include one or more of a link layer address, a VLAN identity, a label, a tag, or a MPLS tag. Classification 306 may include additional classification types such as a cookie classification, a user identity classification, a content classification, a pattern, a string, or other forms of classification.

In various embodiments, forwarding node 118 may match data packet 302 against classification 306 to determine if there is a match with classification rule 304. Forwarding node 118 may determine that there is a match between data packet 302 and classification 306, and forwarding node 118 may select servicing node 120 using primary servicing node information 308. Forwarding node 118 may apply additional processing to data packet 302 according to primary servicing node information 308. Forwarding node 118 may then send data packet 302, modified if appropriate, to servicing node 120. Additionally, forwarding node 118 may check secondary servicing node information 310 and determine if servicing node 120 matches the condition in secondary servicing node information 310. Forwarding node 118 may determine if servicing node 120 is busy or is not available, and forwarding node 118 may select servicing node 122 and send data packet 302 to servicing node 122 according to secondary servicing node information 310.

Primary servicing node information 308 or secondary servicing node information 310 may include data treatment processing relating to access control, traffic management, bandwidth management, quality of service, legal interception, security handling, tunneling, security detection, duplicating, debugging, or other data-oriented processing treatment.

Classification 306 may include a source IP address classification 402. Forwarding node 118 may obtain a source IP address of data packet 302 and match the obtained source IP address of data packet 302 against the source IP address classification 402 of classification 306. Forwarding node 118 may obtain a source port of data packet 302 and match it against the source port classification 404 of classification 306. Forwarding node 118 may obtain a destination port of data packet 302 and match it against the destination port classification 406 of classification 306. Forwarding node 118 may obtain a link layer address of data packet 302 and match it against the link layer address classification 408 of classification 306. Forwarding node 118 may obtain one or more of data pieces from data packet 302 and match the obtained data against corresponding classification data in classification 306. In various embodiments, all classification data must match data packet 302 in order to affirmatively match classification 306. In some other embodiments, it is sufficient for one or more of classification data of classification 306 to match data packet 302 for forwarding node 118 to determine if data packet 302 matches classification 306.

Forwarding node 118 may perform pre-determined calculating steps while matching data packet 302 to classification 306. Pre-determined calculating steps may include a hashing function, a bit-wise operation, a cryptographic function, a comparison, or a lookup function. Pre-determined calculating steps may also include hardware such as a Context Addressable Memory (CAM), T-CAM, FPGA, DSP, or any lookup hardware accelerator.

As aforementioned in FIG. 1, forwarding node 118 may receive forwarding policy 124 from network controller 126. In an exemplary embodiment illustrated in FIG. 5, network controller 126 may generate forwarding policy 502 and send forwarding policy 502 to forwarding node 118. In various embodiments, forwarding node 118 may update or replace forwarding policy 124 with received forwarding policy 502.

Network controller 126 may generate forwarding policy 502 based on capability information 504 received from servicing node 120 and optionally other servicing nodes of service network 114. Network controller 126 may include classification configuration 506. In various embodiments, network controller 126 may receive classification configuration 506 from a network administrator, a network computer, or a predetermined configuration stored in a storage module of network controller 126.

Figure 5:
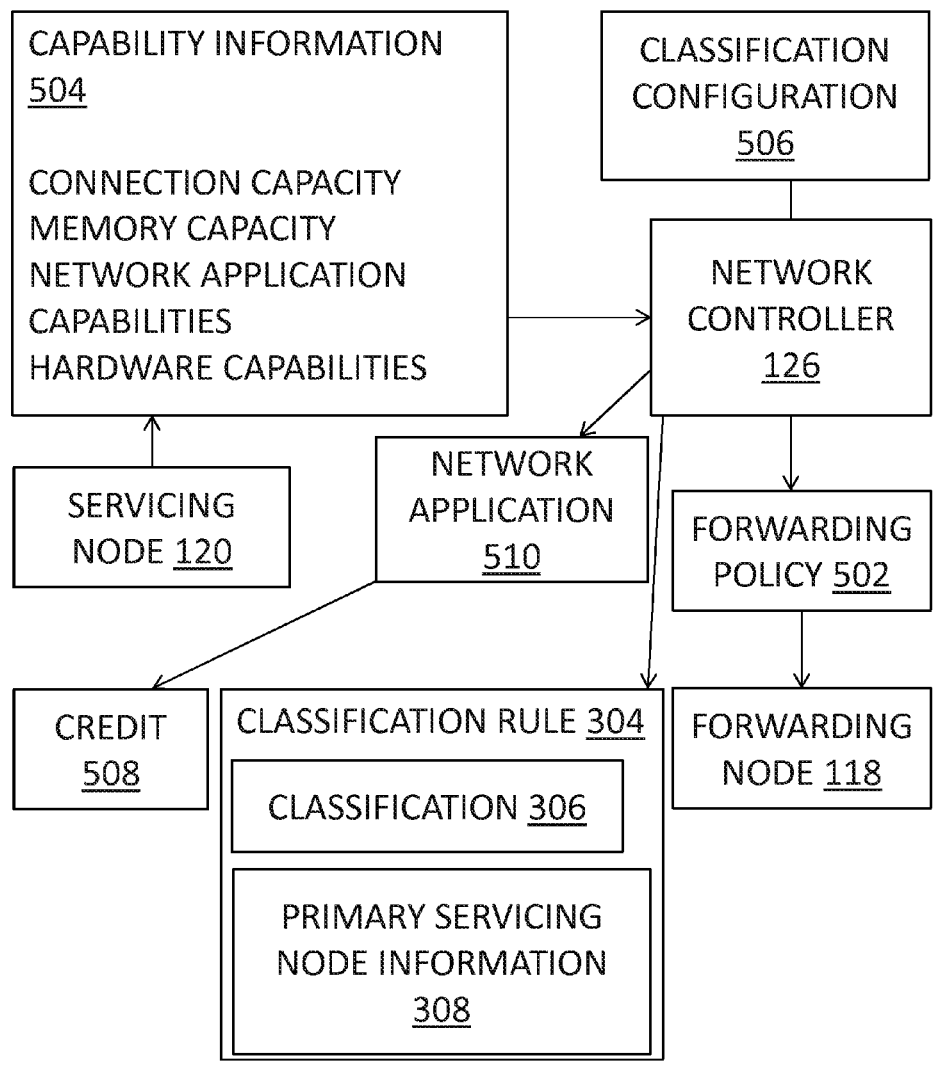
FIG. 5 illustrates an exemplary embodiment of a network controller to generate a forwarding policy.
Figure 6:
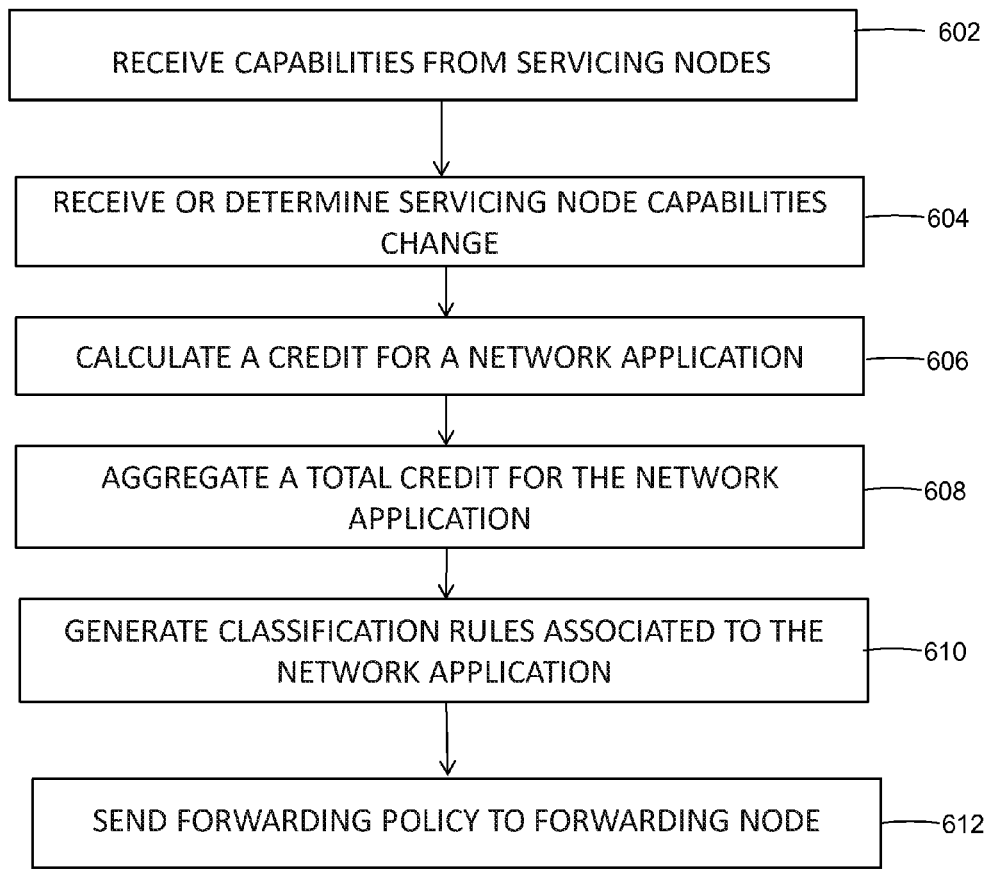
FIG. 6 illustrates an exemplary method to generate a forwarding policy.

Network controller 126 may perform a plurality of steps illustrated in FIG. 6 in conjunction with FIG. 5 to generate forwarding policy 502. In step 602, network controller 126 receives capability information 504 from service nodes. Capability information 504 may include various capabilities regarding the service nodes and capacities for the capabilities. Example capacities and capabilities of capability information 504 may include connection capacity, memory capacity, network applications, capabilities and capacities for the network applications, and hardware acceleration capabilities and capacities. Hardware acceleration of servicing node 120 may include encryption hardware, network processor, FPGA, ASIC, network packet streaming engine, video codec, DSP, data de-duplication hardware accelerator, deep packet inspection hardware accelerator, graphics processor, or other hardware accelerator designed to speed up network packet or network application processing. Network applications of servicing node 120 may include HTTP proxy, TCP proxy, security detection or prevention application, legal interception, deep packet inspection, web browser proxy, content caching, WAN optimization, video streaming optimization, email optimization, content delivery network application, or other network-based service application to assist service application served by a server. Capability information 504 may be categorized into capability and capacity for one or more network applications.

In step 604, network controller 126 may determine if received capability information 504 is different from previously received capability information from servicing node 120. Received capability information 504 may replace or update any previously received capability information from servicing node 120.

In step 606, network controller 126 may calculate a credit 508 for servicing node 120 using capability information 504. Network controller 126 may obtain capability of a network application 510 from capability information 504 and calculate credit 508 using the network application 510 capability. Network controller 126 may use classification configuration 506 to calculate credit 508. Typically, the higher or better the network application 510 capability, the higher credit 508 that may be assigned. Capability information 504 may indicate an SSL encryption hardware used for network application 510. Network controller 126 may assign a credit of 2 to servicing node 120 for network application 510. Capability information 504 may indicate network application 510 may require SSL but no SSL hardware may be listed in capability information 504. Network controller 126 may assign a value of 1 to credit 508 for SSL network application 510. Network controller 126 may assign credit 508 a value of 4 if SSL hardware is available, according to classification configuration 506.

Network controller 126 may calculate a value of 3 for credit 508 if capability information 504 indicates HTTP proxy network application 510 allows a capacity of 10,000 connections. Network controller 126 may use classification configuration 506 to calculate credit 508 for HTTP proxy application.

In step 608, network controller 126 may calculate a total credit for network application 510 over a plurality of servicing nodes. Network controller 126 may calculate the total credit by adding the credits, including credit 508, for network application 510. Network controller 126 may multiply each credit with a multiplying factor according to classification configuration 506 prior to adding the credits. The total credit for network application 510 may be 32 and servicing node 120 may have credit 508 of value 3 for network application 510.

In step 610, network controller 126 may generate a plurality of classification rules associated to network application 510. Network controller 126 may generate a classification rule 304, which includes classification 306 associating to network application 510. Network application 510 may be associated to a TCP/UDP port number. Classification 306 may include a destination port number.

In various embodiments, network controller 126 may generate 32 classification rules, according to the total credit of 32 associated to network application 510. Among the 32 rules, 3 rules, according to credit 508, may indicate servicing node 120 as primary servicing node information. Network controller 126 may divide the available IP addresses into 32 partitions, one partition per classification rule. Furthermore, network controller 126 may apply a hashing function to the IP address to result in 32 different values. Network controller 126 may create 32 entries in a lookup table for the 32 classification rules. Network controller 126 may partition IP addresses using 5 bits of IP addresses, first 5 bits, last 5 bits, middle bits, or a combination of 5 bits out of a 32-bit or 128-bit IP address to form a distinct 32 different partitions for the IP addresses. Network controller 126 may generate classification rule 304 having classification 306 and primary servicing node information 308. Classification 306 may include a source IP address being one of the 32 IP address partition or a destination port number being the TCP/UDP port number of network application 510. Primary servicing node information 308 may indicate servicing node 120.

Network controller 126 may randomly assign 3 partitions for servicing node 120. Network controller 126 may assign the first 3 partitions. Network controller 126 may apply a mathematical function such as a hashing function to assign 3 partitions for the servicing node 120. Network controller 126 may select 3 entries in a created 32-entry lookup table for the classification rules.

Network controller 126 may generate all 32 classification rules according to the total 32 credits for network application 510. Alternatively, network controller 126 may generate less than 32 classification rules, perhaps by dividing into fewer number of IP address partitions. Network controller 126 may store the classification rules into forwarding policy 502.

Network controller 126 may calculate credit 508 for servicing node 120 based on a capacity, such as connection capacity, without considering association to a network application. Network controller 126 may calculate the total credit for a plurality of servicing nodes, including servicing node 120, associated to the capacity. Network controller 126 may generate a plurality of classification rules based on the capacity. Network controller 126 may store the generated classification rules based on the capacity into forwarding policy 502.

Network controller 126 may partition UDP/TCP port numbers. Network controller 126 may put into classification 306 source port number being a port number partition. Network controller 126 may partition both port numbers and IP addresses for network application 510.

Network application 510 may be associated with a plurality of port numbers, and network controller 126 may include the plurality of port numbers as destination port numbers for classification 306.

Network controller 126 may assign servicing node 120 as secondary servicing node for one or more classification rules for network application 510. Network controller 126 may use classification configuration 506 to assign a secondary servicing node. Capability information 504 may include information to assist network controller 126 to select servicing node 120 as secondary servicing node.

Network controller 126 may repeat steps 606-610 and generate a plurality of classification rules for other network applications. Network controller 126 may store the generated classification rules in forwarding policy 502.

In step 612, network controller 126 may send generated forwarding policy 502 to forwarding node 118.

In various embodiments, network controller 126 may generate forwarding policy 502 when network controller 126 receives capability information 504 from servicing node 120. Network controller 126 may also generate forwarding policy 502 after receiving capability information from a plurality of servicing nodes. In some embodiments, network controller 126 may periodically generate forwarding policy 502. Network controller 126 may generate forwarding policy 502 when it detects a change in capability information of a servicing node.

Figure 7:
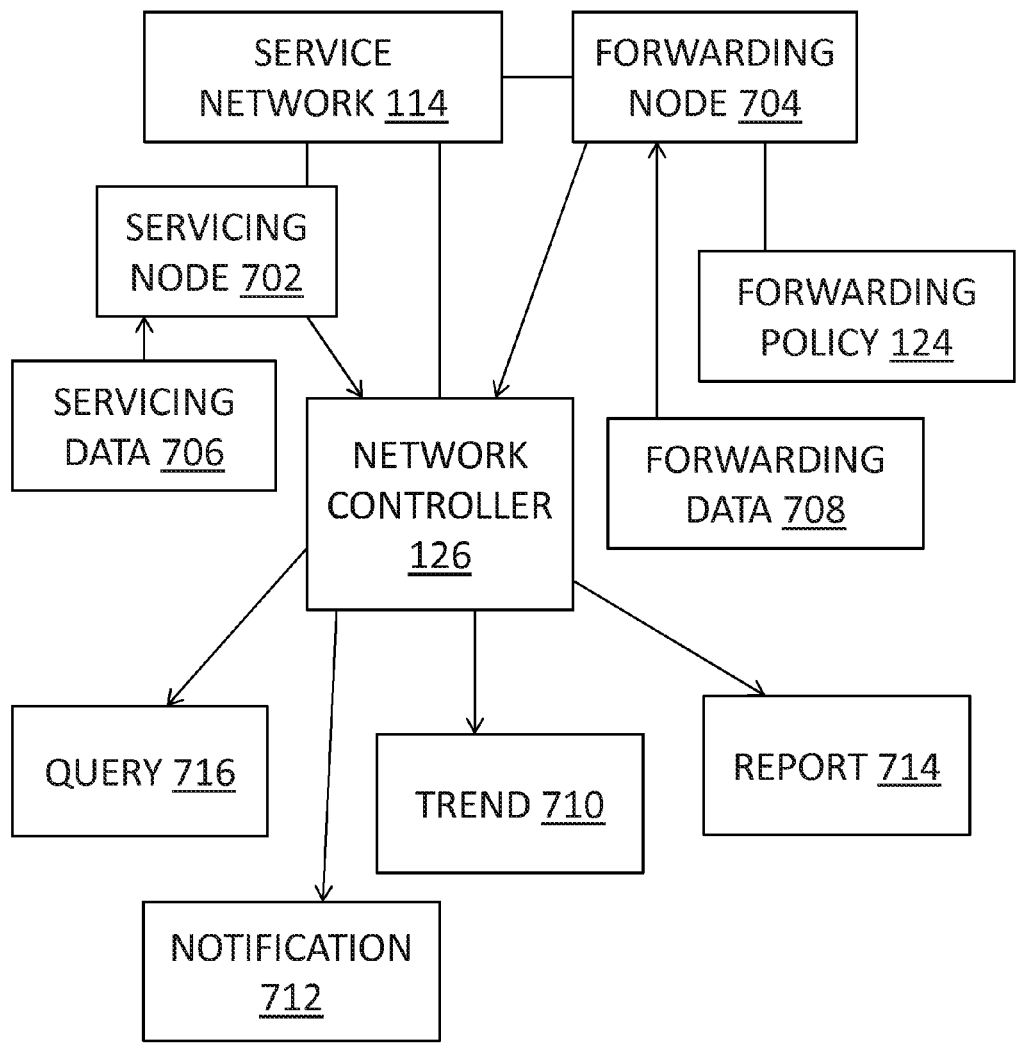
FIG. 7 illustrates an exemplary embodiment of a network controller to generate reports for a service network.

In an exemplary embodiment illustrated in FIG. 7, network controller 126 may collect statistics data from servicing node 702 and forwarding node 7042. Servicing node 702 may send servicing data 706 to network controller 126. Servicing data 706 may contain information related to service sessions and data packets servicing node 702 receives from one or more forwarding nodes. Servicing data 706 may contain a number of active service sessions or connections, a number of completed service sessions, a number of pending connections, an amount of data packet or traffic processed, a percentage of system utilization, a quantity representing utilization of capacities of servicing node 702, a plurality of quantities of durations of service sessions, averages, or other useful data regarding servicing node 702. Servicing node 702 may send servicing data 706 when network controller 126 requests the data. Servicing node 702 may provide servicing data 706 frequently, based on a schedule, triggered by an event, or when there is a change relating to servicing data 706.

Forwarding node 704 may send forwarding data 708 to network controller 126. Forwarding data 708 may contain information related to forwarding policy 124. Forwarding data 708 may contain a number of packets processed, a number of packets processed according to individual classification rule, a plurality of classification rules, a number of service session packets forwarded to a servicing node or a plurality of servicing nodes, an amount of data traffic processed according to forwarding policy 124, or other data useful for network controller 126 to analyze forwarding policy 124. Additionally, forwarding node 118 may provide forwarding data 708 frequently, based on a schedule, triggered by an event, when there is a change related to forwarding data 708, when forwarding policy 124 is changed, or when requested by network controller 126.

Network controller 126 may receive servicing data from one or more servicing nodes, including servicing node 702, and/or forwarding data from one or more forwarding nodes, including forwarding node 704, over a period of time. These one or more servicing nodes and one or more forwarding nodes may be part of service network 114. Network controller 126 may analyze servicing data 706 and forwarding data 708 to report a trend 710. Trend 710 may relate to behavior of service network 114 or forwarding policy 124. Trend 710 may reflect one or more behaviors over a period of time, where network controller 126 receives servicing data and forwarding data over the period of time. Trend 710 may also include a chart showing data traffic for a classification rule of servicing node 702 in forwarding policy 124. Trend 710 may compare a classification rule of servicing node 702 to another classification rule of forwarding policy 124. Trend 710 may compare capability utilization of servicing node 702 and another servicing node indicated in forwarding policy 124. Trend 710 may indicate utilization of servicing node 702 or service network 114 over the period time.

Network controller 126 may generate a notification 712 based on servicing data 706 and/or forwarding data 708. Network controller 126 may generate notification 712 based on trend 710. Notification 712 may indicate a significant piece of information related to forwarding policy 124. Notification 712 may indicate servicing node 702 had a load above an expected load threshold, suggesting to a network administrator to adjust a service policy for service network 114 or to add another servicing node to service network 114. Alternatively, notification 712 may indicate servicing node 702 performs below an expected load threshold, suggesting a network administrator to adjust a service policy, to redeploy a servicing node from service network 114, or to remove servicing node 702 from service network 114. Notification 712 may indicate forwarding node 704 has an overall system load exceeding an expected load, suggesting to a network administrator to adjust a forwarding policy or classification configuration, to add additional resources to forwarding node 704 or to add another forwarding node to service network 114. Notification 712 may indicate an under-utilization of forwarding node 704.

In some embodiments, notification 712 indicates a network application capability is overloaded, suggesting adding additional hardware acceleration to the network application capability or additional servicing node for the network application. Notification 712 may suggest removing capability of a network application due to low utilization. Notification 712 may include one or more suggestions.

Network controller 126 may combine servicing data 706, servicing data from other servicing nodes, forwarding data 708, and forwarding data from other forwarding nodes into a report 714. Network controller 126 may generate report 714 based on a schedule, upon request, or when new servicing data or forwarding data is received.

Network controller 126 may receive a query 716 about servicing data 706 and/or forwarding data 708. Network controller 126 may process and respond to query 716. Furthermore, network controller 126 may store servicing data 706 and forwarding data 708 in a storage module or a database system. Network controller 126 may send servicing data 706 or forwarding data 708 to a database system and process query 716 using the database system.

What is claimed is:
1. A computer-implemented method for forwarding a data packet in a service network, comprising:
sending, to a network controller, a capability of a first servicing node associated with a service address;
sending, to the network controller, a collection of statistics data related to the capability;
receiving an updated forwarding policy;
receiving, from a client device of a plurality of client devices, the data packet having the service address associated with the first servicing node, the first servicing node selectively forwarding data packets to a first plurality of servers;

identifying a classification rule of the updated forwarding policy using the service address, the classification rule including first information associated with the first servicing node and second information associated with a second servicing node, the second servicing node selectively forwarding other data packets to a second plurality of servers, the second information comprising a condition for forwarding the data packet to the second servicing node, the condition being associated with a capability of the first servicing node;

identifying, using the updated forwarding policy, based on the first information associated with the first servicing node, that the condition comprised in the second information is satisfied;

based on the condition, the first information, and the second information, determining the data packet is to be sent to the second servicing node;

sending the data packet to the second servicing node; and providing to the network controller a second collection of statistics data related to the forwarding policy.

2. The computer-implemented method of claim 1, wherein the secondary servicing node information includes an indication to forward the data packet to the second servicing node when a condition of the first servicing node is satisfied.

3. The computer-implemented method of claim 2, wherein the classification rule further comprises one or more of: a source IP address, a source port number, a destination port number, and a link layer address.

4. The computer-implemented method of claim 2, wherein the identifying further comprises one or more of: a hashing function, a bit-wise operation, a cryptographic function, a comparison, or a lookup function, and extracting a part of a network address of the data packet.

5. The computer-implemented method of claim 1, wherein the first information and second information each further include a respective capability, the respective capabilities each comprising one or more of: a network application availability, a network application capability, a network application capacity, a connection capacity, a hardware module, a hardware processing acceleration, and a hardware based encryption processor module.

6. The computer-implemented method of claim 1, wherein the updated forwarding policy is received from the network controller, wherein the network controller gets a present capability of at least one of the first servicing node and the second servicing node.

7. A non-transitory computer-readable medium comprising computer readable code, which when executed by one or more processors, implements a method for forwarding a data packet in a service network, the method comprising:

sending to a network controller a capability of a first servicing node associated with a service address;

sending to the network controller a collection of statistics data related to the capability;

receiving an updated forwarding policy;

receiving, from a client device of a plurality of client devices, the data packet having the service address associated with the first servicing node, the first servicing node selectively forwarding data packets to a first plurality of servers;

identifying a classification rule of the updated forwarding policy using the service address, the classification rule including first information associated with the first servicing node and second information associated with a second servicing node, the second servicing node selectively forwarding other data packets to a second plurality of servers, the second information comprising a condition for forwarding the data packet to the second servicing node, the condition being associated with a capability of the first servicing node;

identifying, using the updated forwarding policy, based on the first information associated with the first servicing node, that the condition comprised in the second information is satisfied;

based on the condition, the first information, and the second information, determining the data packet is to be sent to the second servicing node;

sending the data packet to the second servicing node; and providing to the network controller a second collection of statistics data related to the forwarding policy.

8. A computer-implemented method for generating a forwarding policy for a service network comprising a forwarding node and a plurality of servicing nodes, the method comprising:

receiving a capability from a servicing node associated with a service address, the service address associated with a servicing node of the plurality of servicing nodes, wherein the capability of the servicing node comprises one or more of: a network application availability, a network application capability, a network application capacity, a connection capacity, a hardware module, a hardware processing acceleration, and a hardware based encryption processor module;

determining a condition for forwarding a data packet having the service address associated with the servicing node to another servicing node, the condition being associated with the capability of a first servicing node;

generating a forwarding policy using the received capability and a second capability of another servicing node, the forwarding policy comprising a plurality of classification rules, wherein the generating the forwarding policy includes:

generating first information associated with the servicing node and second information associated with an another second servicing node, the first information including at least an identity of the servicing node and an indication to forward the data packet to the servicing node, and the second information including an identity of the another servicing node and an indication to forward the data packet to the another servicing node when the condition associated with the servicing node is satisfied; and storing the first information and the second information to the plurality of classification rules;

storing the generated forwarding policy;

sending the forwarding policy to the forwarding node, wherein the forwarding policy applies the forwarding policy to a received data packet;

receiving statistical data from the forwarding node relating to the forwarding policy; and generating a report based on the received statistical data.

9. The computer-implemented method of claim 8, wherein the plurality of classification rules comprises a first one or more classification rules for the servicing node and a second one or more classification rules for the second servicing node.

10. The computer-implemented method of claim 8, further comprising generating a report based on the received statistical data.

11. The computer-implemented method of claim 8, further comprising:
receiving an updated capability of the servicing node;
generating an updated plurality of classification rules based on the updated capability; and
updating the forwarding policy with the updated plurality of classification rules.

12. The computer-implemented method of claim 8, wherein each of the plurality of classification rule comprises a classification and an indication to the servicing node or the second servicing node.

13. The computer-implemented method of claim 12, wherein the classification comprises one or more of: a source IP address, a source port number, a destination port number, and a link layer address.

14. The computer-implemented method of claim 13, wherein storing the forwarding policy comprises sending the forwarding policy to a forwarding node, wherein the forwarding policy applies the forwarding policy to matching a received data packet against a classification of the plurality of classification rules in the forwarding policy.

15. The computer-implemented method of claim 8, wherein the generating is further based on the received statistics data and a second statistics data from the second servicing node.

16. The computer-implemented method of claim 15, wherein the generating further comprises comparing the received statistics data and the second statistics data.

17. The computer-implemented method of claim 15, wherein the generating further comprises comparing the received statistics data, the second statistics data and the plurality of classification rules.

18. A non-transitory computer-readable medium comprising computer readable code, which when executed by one or more processors, implements a method for generating a forwarding policy for a service network comprising a forwarding node and a plurality of servicing nodes, the method comprising:
receiving a capability from a servicing node associated with a service address, the service address associated with a servicing node of the plurality of servicing nodes, wherein the capability of the servicing node comprises one or more of: a network application availability, a network application capability, a network application capacity, a connection capacity, a hardware module, a hardware processing acceleration, and a hardware based encryption processor module;
determining a condition for forwarding a data packet having the service address associated with the servicing node to another servicing node, the condition being associated with the capability of a first servicing node;
generating a forwarding policy using the received capability and a second capability of another servicing node, the forwarding policy comprising a plurality of classification rules, wherein generating the forwarding policy includes:
generating first information associated with the servicing node and second information associated with an another second servicing node, the first information including at least an identity of the servicing node and an indication to forward the data packet to the servicing node, and the second information including an identity of the another servicing node and an indication to forward the data packet to the another servicing node when the condition associated with the servicing node is satisfied; and
storing the first information and the second information to the plurality of classification rules;
storing the generated forwarding policy;
sending the forwarding policy to a forwarding node, wherein the forwarding policy applies the forwarding policy to a received data packet;
receiving statistical data from the forwarding node relating to the forwarding policy; and
generating a report based on the received statistical data.

19. A service network system for forwarding a data packet in a service network, comprising:
a plurality of servicing nodes, wherein each of the plurality of servicing nodes is configured to:
send to a network controller a capability of a servicing node associated with a service address; and
send to the network controller a collection of statistics data related to the capability;
a forwarding node, the forwarding node being configured to:
receive from the network controller an updated forwarding policy comprising a plurality of classification rules;
receive a data packet, the data packet having a first service address associated with a first servicing node, the first servicing node selectively forwarding data packets to a first plurality of servers;
identify a classification rule of the plurality of classification rules using the service address, the classification rule including first information associated with the first servicing node and second information associated with a second servicing node, the second servicing node selectively forwarding other data packets to a second plurality of servers, the second information comprising a condition for forwarding the data packet to the second servicing node, the condition being associated with a capability of the first servicing node;
identify, using the updated forwarding policy, based on the first information associated with the first servicing node, that the condition comprised in the second information is satisfied;
based on the condition, the first information, and the second information, determine the data packet is to be sent to the second servicing node;
send the data packet to the second servicing node; and
provide to the network controller a second collection of statistics data related to the forwarding policy; and
the network controller, the network controller being configured to:
receive a plurality of capabilities from the plurality of servicing nodes;
generate the plurality of classification rules based on the received plurality of capabilities;
store the generated plurality of classification rules in the forwarding policy;
send the forwarding policy to the forwarding node;
receive the plurality of statistics data from the plurality of servicing nodes;
receive the statistics data from the forwarding node; and
generate a report based on the received statistics data.

20. The computer-implemented method of claim 1, wherein the determining uses a characteristic of the client device, the characteristic of the client comprising at least one of specification of encrypted sessions and specification of a particular servicing node of a plurality of servicing nodes.

21. The computer-implemented method of claim 5, wherein the respective capabilities each further comprise at least one of a security processor, digital signal processor, network processor, and graphics or video processor.

22. The computer-implemented method of claim 5, wherein the respective capabilities each further comprise at least one of content caching and encryption.

23. The computer-implemented method of claim 5, wherein the respective capabilities each further comprise recording access.

* * * * *